(12) United States Patent
Lawandy et al.

(10) Patent No.: US 6,296,189 B1
(45) Date of Patent: Oct. 2, 2001

(54) METHODS AND APPARATUS EMPLOYING MULTI-SPECTRAL IMAGING FOR THE REMOTE IDENTIFICATION AND SORTING OF OBJECTS

(75) Inventors: Nabil M. Lawandy, North Kingstown; John A. Moon, Cumberland, both of RI (US)

(73) Assignee: Spectra Science Corporation., Providence, RI (US)

( * ) Notice: Subject to any disclaimer, the term of this patent is extended or adjusted under 35 U.S.C. 154(b) by 0 days.

(21) Appl. No.: 09/379,062

(22) Filed: Aug. 23, 1999

Related U.S. Application Data
(60) Provisional application No. 60/097,906, filed on Aug. 26, 1998, and provisional application No. 60/140,567, filed on Jun. 23, 1999.

(51) Int. Cl.[7] .................................................. G06K 19/06
(52) U.S. Cl. ............................................................ 235/491
(58) Field of Search .................................. 209/3.3, 44.1, 209/546, 552, 567, 577, 578, 580, 581, 587; 235/61.11, 456, 462.04, 469, 470, 491

(56) References Cited

U.S. PATENT DOCUMENTS

| | | | |
|---|---|---|---|
| 3,513,320 | * | 5/1970 | Weldon ................................. 250/219 |
| 3,902,047 | | 8/1975 | Tyler et al. ......................... 235/61.11 |
| 4,044,227 | | 8/1977 | Holm et al. .......................... 235/61.7 |

(List continued on next page.)

FOREIGN PATENT DOCUMENTS

| | | | |
|---|---|---|---|
| 0 578859A1 | 7/1992 | (DE) | ................................ B07C/3/08 |
| 0 509280A2 | 3/1992 | (EP) | ................................ B07C/3/00 |
| 0 509 280 A2 | 10/1992 | (EP) . | |
| 0 578 859 A1 | 1/1999 | (EP) . | |
| 2095822A | 3/1981 | (GB) | ............................... G06K/7/10 |
| 2 095 822 A | 10/1982 | (GB) . | |

OTHER PUBLICATIONS

Sequential–Readout Identification Tag, by J.A. Dickerson and J.A. Williams in IBM Technical Disclosure Bulletin, vol. 17, No. 3, Aug. 1974.

Generation of Stimulated Noncoherent Radiation in Light–Scattering Media Exhibiting Chemical Reactions by I.A. Izmailov et al. in Sov. J. Quantum Electron, 12(5), May 1982.

Generation of Light by a Scattering Medium with Negative Resonance Absorption by V.S. Letokhov in Soviet Physics JetP, vol. 26, No. 4, Apr. 1968.

International Search Report dated Feb. 11, 2000.

(List continued on next page.)

*Primary Examiner*—Donald P. Walsh
*Assistant Examiner*—Mark J. Beauchaine
(74) *Attorney, Agent, or Firm*—Harrington & Smith, LLP

(57) ABSTRACT

A multi-spectral imager and the applications of same for the marking and coding of, for example, textiles, linens, garments, documents and packages for high-speed machine identification and sortation. Specific uses include garment and textile rental operations, laundry operations, and the postal and mail sortation of documents and packages. Methods and apparatus are provided to identify items via information encoded within an applied mark, as well as a novel mark reading/decoding scheme. A method is disclosed for printing fluorescent marks on an item, such as a heat-sealable label, to generate a unique identification number or indicia, as well as a reader system for reading applied marks. The reader system includes an illumination source that excites the fluorescent marks in combination with a color sensitive device, such as a camera, which is "blind" to the illumination wavelength but which can discern the fluorescence color and a relative spatial order of the fluorescent marks, wherein the information is encoded.

37 Claims, 6 Drawing Sheets

U.S. PATENT DOCUMENTS

| | | | |
|---|---|---|---|
| 4,924,088 | 5/1990 | Carman et al. | 250/271 |
| 5,128,528 | 7/1992 | Heninger | 235/470 |
| 5,448,582 | 9/1995 | Lawandy | 372/42 |
| 5,881,886 * | 3/1999 | Lawandy | 209/3.3 |
| 5,920,056 | 7/1999 | Bonnet | 235/383 |

OTHER PUBLICATIONS

"Sequential–Readout Identification Tag" by Dickerson, et al., IBM Technical Disclosure Bulletin, vol. 17 No. 3 Aug. 1974, pp. 782–783.

"Generation of stimulated noncoherent radiation in light–scattering media exhibiting chemical reactions" by Izmallov, et al., Institute of Semiconductors, Academy of Sciences of the Ukranian SSR, Kiev, Apr. 12, 1981, pp. 588–594.

"Generation of Light by a Scattering Medium with Negative Resonance Absorption" by Letokhov, P.N. Lebedev Physics Institute, USSR Academy of Sciences, 1967, pp. 835–840.

* cited by examiner

METHODS AND APPARATUS EMPLOYING MULTI-SPECTRAL IMAGING FOR THE REMOTE IDENTIFICATION AND SORTING OF OBJECTS

CLAIM OF PRIORITY FROM COPENDING PROVISIONAL PATENT APPLICATIONS

Priority is herewith claimed under 35 U.S.C. §119(e) from copending Provisional Patent Application No. 60/097,906, filed Aug. 26, 1998, entitled "Multi-Spectral Imaging", by John Moon; Priority is herewith also claimed under 35 U.S.C. §119(e) from copending Provisional Patent Application No. 60/140,567, filed Jun. 23, 1999, entitled "System for Remote Identification and Sorting of Articles", by John Moon et al. The disclosure of each of these Provisional Patent Applications is incorporated by reference herein in its entirety.

FIELD OF THE INVENTION

This invention relates to systems and methods for marking and coding objects and, more particularly, to systems and methods for optically coding objects such as textiles, linens, garments, documents and packages.

BACKGROUND OF THE INVENTION

A class of industrial problems exists in which a large number of items must be separated, identified, counted and sorted. One example is the textile service industry, wherein soiled garments or linens are returned in large unsorted groups for cleaning and sorting. Present day means for solving this problem cover a broad spectrum. One solution uses manual workers who sequentially sort amongst the many items, picking single items manually and identifying the items visually. This solution is unsatisfactory because it is both slow and expensive, due to the high reliance on manual labor.

There are also numerous coding and sorting applications in the multi-billion dollar textile services industry whose requirements are not efficiently met by bar codes or radio frequency identification (RFID). A particularly challenging problem is the sorting of flat goods such as napkins, tablecloths, towels and bed linen items. These items, which range in size from very small to large, are presented in distorted orientations and undergo severe washing and ironing cycles. These are just some of the technology barriers to accurate machine identification and automated counting and sorting of flat goods and bulk garments. The lack of a viable coding and sorting solution for this segment of the textile services industry has resulted in high labor costs, lack of stock control, and reduced profits.

Thus, a technique that provides for the machine readable marking of rental textiles is important for inventory control at commercial laundries and other installations where large quantities of similar-looking materials must be handled in a high speed manner. Currently, only a small fraction of the rental textile industry uses machine readable coding. Most coding currently used to uniquely identify a rental textile item is simply text printed on a heat-sealed label attached to the item, and requires the presence of a human operator.

There are several reasons why the textile rental industry has only slowly adopted machine readable identification technology. Historically, the only available machine readable marking schemes for textiles were bar-codes and radio-frequency ID (RFID). Bar codes are the most commonly available type of machine readable marking in use today. However, tests of identification systems in actual laundries have shown that bar coding is not a robust coding technology on textile items. Bar codes are highly susceptible to degradation through both soiling and wear. Furthermore, due to the precise spatial information required for a bar code (line width and spacing), any warping of the label (almost assured on a fabric substrate) can result in high reading error rates. Finally, bar codes require line-of-sight and (generally) a specific orientation with respect to the detector, both of which are difficult conditions to satisfy under typical large scale laundry conditions.

In contrast, the radio-frequency ID technique does not suffer from the line of sight and soiling problems associated with bar codes. However, RFID remains expensive, both from initial cost and associated maintenance costs, and therefore is normally not economical for the rental textile industry. Furthermore, RFID tags have a tendency to exhibit cross-talk when they are in proximity to one another, which can preclude their use on closely-spaced sorting conveyors.

It can be appreciated that a need exists for a technology that has the ease of use and the low cost associated with bar codes, and yet is more robust and tolerant of the conditions found in large scale commercial laundries and other similar environments, such as large scale document and package handling facilities.

In U.S. Pat. No. 5,881,886 "Optically-Based Methods and Apparatus for Sorting Garments and Other Textiles" one of the inventors of this patent application has described various methods and apparatus that also address the problems referred to above.

OBJECTS AND ADVANTAGES OF THE INVENTION

It is a first object and advantage of this invention to provide an improved optically based system and method for encoding information onto objects, and for subsequently sorting or otherwise processing the objects using the encoded information.

It is a further object and advantage to provide a photonically encoded label wherein information concerning an object is encoded in both the spatial and wavelength domains.

SUMMARY OF THE INVENTION

The foregoing and other problems are overcome and the objects of the invention are realized by methods and apparatus in accordance with embodiments of this invention.

The teachings of this invention provide embodiments of a Multi-Spectral Imager and the application of same for the marking and coding of, for example, textiles, linens, garments, documents and packages for high-speed machine identification and sortation. Specific uses include, but are not limited to, garment and textile rental operations, laundry operations, and the postal and mail sortation of documents and packages.

The teachings of this invention are directed towards providing methods and apparatus that are used to identify items via information encoded within an applied mark, as well as a novel mark reading/decoding scheme. The teachings of this invention are multi-faceted, and encompass a method of printing fluorescent marks on an item, such as a heat-sealable label, to generate a unique identification number or indicia, as well as a reader system for reading applied marks. The reader system includes an illumination source that excites the fluorescent marks in combination with a color sensitive device, such as a camera, which is "blind" to the illumination wavelength but which can discern the fluorescence color and a relative spatial order of the fluorescent marks.

A method is disclosed for encoding information onto an article, and includes steps of (a) expressing the information as a multi-digit number; and (b) encoding the number as a plurality of regions that are disposed in a predetermined linear sequence. Each region emits one of a plurality of predetermined wavelengths comprising a set of wavelengths. A further step applies the plurality of regions to the article by printing the plurality of regions onto a label using a plurality of different fluorescent inks, and then affixing the label to the article, such as by a thermal process.

To readout the encoded information, the method further includes steps of (c) illuminating the plurality of regions with excitation light; (d) detecting a plurality of resulting wavelength emissions from the plurality of regions; and (e) decoding the number from the plurality of resulting wavelength emissions and their location in the linear sequence.

The article can be identified from the decoded number, and a future path that the article takes can be controlled based on the decoded number. As an example, a controller can select a type of washing that the article will receive, and/or a storage location for the article can be determined, based on the decoded number.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
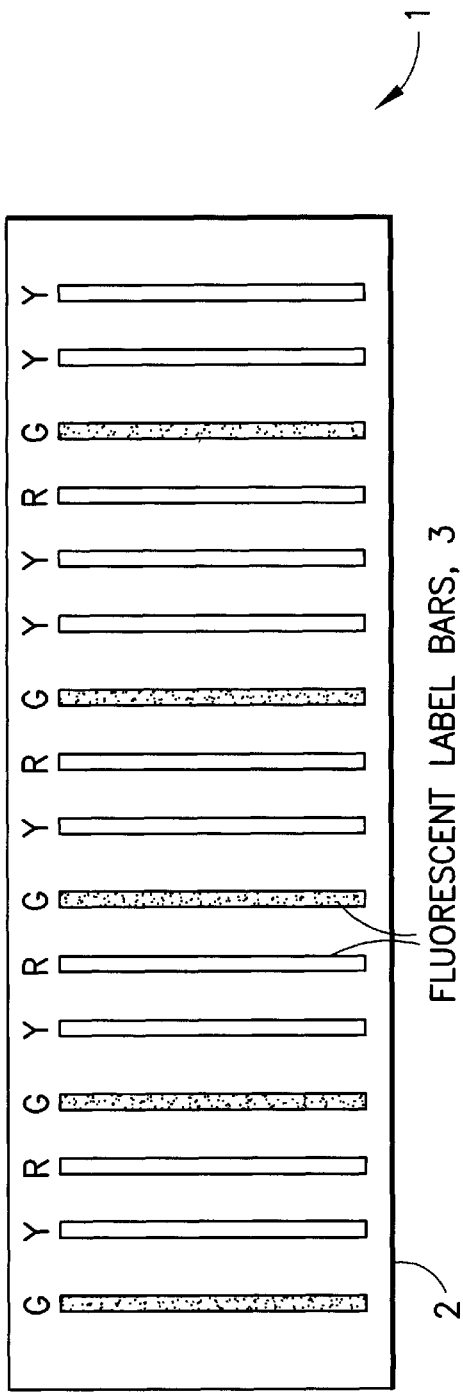
FIG. 1 is a top view of an exemplary embodiment of a label having a plurality of different fluorescent bar-shaped regions arranged in a predetermined linear sequence for encoding information about an article to which the label will be affixed.

A description is first made of the coding technique in accordance with this invention. FIG. 1 depicts a preferred embodiment of a marking for a textile rental application. In one embodiment a plurality of fluorescent bands are gapplied using a standard impact printing technology. In other embodiments the plurality of fluorescent bands are applied using, for example, ink jet printing, screening, sublimation, or stamping. As such, any number of techniques for applying the marks can be used, and as employed herein such techniques are generally referred to as "printing".

In general, the applied photonic ink is comprised of plastic fluorescent pigment and a standard phthalate ester plasticizer carrier. In a presently preferred embodiment of a formulation for a fluorescent impact printing ink, the preferred impact ink formula is 40 g/100 ml of fluorescent pigment/phthalate plasticizer. The phthalate plasticizer is preferably diisononyl phthalate. Other combinations of phthalate plasticizers, such as dioctyl, dibutyl, diethyl, etc. phthalate may be used as well. The only requirement is that the resulting phthalate ester/pigment combination does not soften the plastic cartridge that contains the nylon impact printing ribbon. The presently preferred fluorescent pigment is a finely-ground thermoset plastic resin which contains a selected fluorescent dye (such as one of the rhodamines) cross-linked into the matrix. Other embodiments include organic or inorganic phosphorescent and fluorescent pigments that are not significantly degraded by an industrial laundering process.

Figure 3:
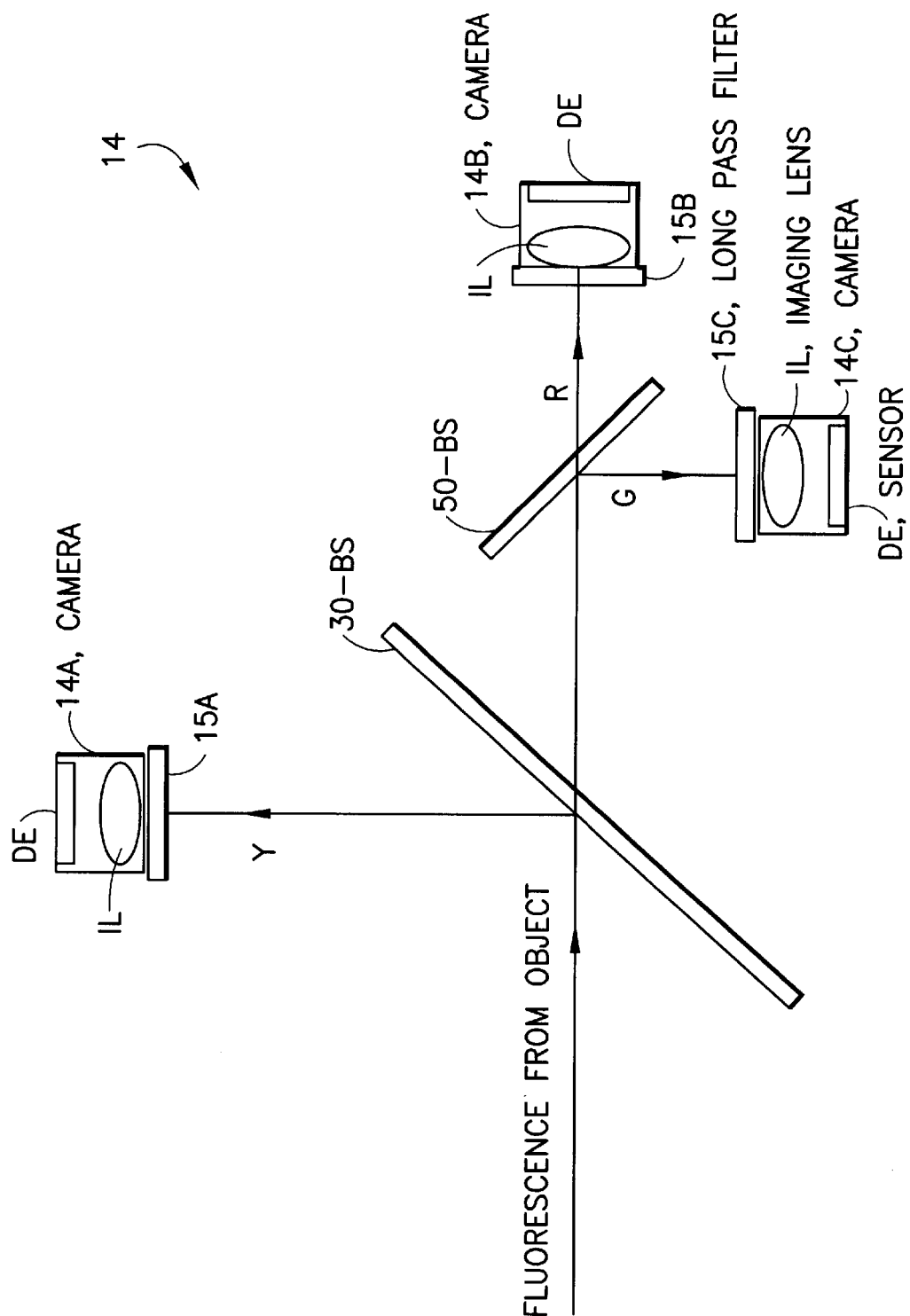
FIG. 3 is a block diagram of one embodiment of a color sensitive camera found in the system of FIG. 2.

The selected inks can be applied with standard commercial dot matrix print cartridges, wherein each cartridge may hold, for example, three distinct optically active inks (e.g., red, yellow, green), and (optionally) a conventional black ink for printing operator-readable information. The labels 1 can be printed on durable thermal seal stock 2 and attached with standard heat seal equipment. A conventional printer 4 is shown in FIG. 3 for printing the labels 1, using a cartridge 5 that holds, for example, red, yellow and green fluorescent inks in accordance with this invention. In practice, the printer is driven by a suitable computer (not shown) having a program for generating numerical codes based on a desired coding technique (e.g., large napkins are assigned one group of numbers, small napkins another, etc.), and another or the same program for converting the generated number into a linear sequence of distinct wavelengths to be applied as fluorescent inks by the printer 4.

In other embodiments the fluorescent bars 3 can be applied directly to the textile, linen or garment, or applied to a preexisting label on the textile, linen or garment, or applied to a removable (and possibly reusable) tag, or applied in any way that is suitable for the intended purpose of identifying, sorting and controlling the handling of the textiles, linens or garments.

In further embodiments the foregoing teachings are applied as well to other objects to be identified and sorted, including, by example, mail pieces, packages, documents, financial instruments, boxes containing various types of goods, etc.

In the example of FIG. 1 a label 1 is comprised of a suitable label stock substrate 2 having a plurality (e.g., 16) vertical fluorescent bars 3 applied thereto. In this example three different fluorescent colors are used: green (G), yellow (Y) and red (R). Each color is assigned to a number. For example, green=1, yellow=2, and red=3. A code is formed by reading fluorescent colors from left to right as, for example, (green) (yellow) (yellow)=122 (base3). The number of possible combinations for a given number of fluorescent marks n in therefore $3^n$. Thus, for three fluorescent colors and thirteen of the bars 3, the number of possible combinations is approximately 1.6 million.

The example label 1 has 16 bars. Assuming a code based on 13 bars, this leaves three bars for error correction purposes. The bars on either end can be reserved for checking the orientation of the label (so that the code is always reconstructed starting with the green bar and ending with the yellow bar.) Also, any label that does not have a green bar on one end and yellow bar on the other end can be immediately rejected. Furthermore, one or many bars may be reserved for a modulo-M division check of the decoded word, where M is an integer greater than one. This represents another level of error correction which can be built into the code. Many other error correction schemes can be used as well, as should occur to those skilled in the art.

It should be noted that this coding scheme preferably uses a fixed, pre-determined number of bars. The codes are not weighted by the presence or absence (i.e. binary weighting) of a bar in any particular position. All bars must be present in order to have a successful decode. This is in contrast to a standard fluorescent bar code, which uses a single fluorescent color and then determines the bit value, not by fluorescence color, but by the distance between the presence or absence of a color.

The pattern of bars can be read in either direction (e.g., forward starting from a green bar and ending with a yellow bar, or reverse starting with yellow and ending with green), and the resulting code simply reversed if it is determined from the first bar read that the pattern of bars 3 was read in the reverse direction.

This aspect of the invention thus provides a method for encoding information onto articles, and includes steps of expressing the information as a multi-digit number; and encoding the number as a plurality of regions (e.g., the bars 3) that are disposed in a predetermined linear sequence, wherein each region emits one of a plurality of predetermined wavelengths comprising a set of wavelengths.

It should be noted that the label 1 can be coated after printing and thermal application to a garment or textile of interest. For example, an ultra-violet (UV) radiation curable clear coating may be applied to the label 1, at least so as to cover the plurality of regions or the bars 3, after printing and possibly heat sealing the label. The clear coating beneficially improves the wash characteristics. An example of such a coating resin is CraigCoat 1081R, which is available from Craig Adhesives.

Figure 2:
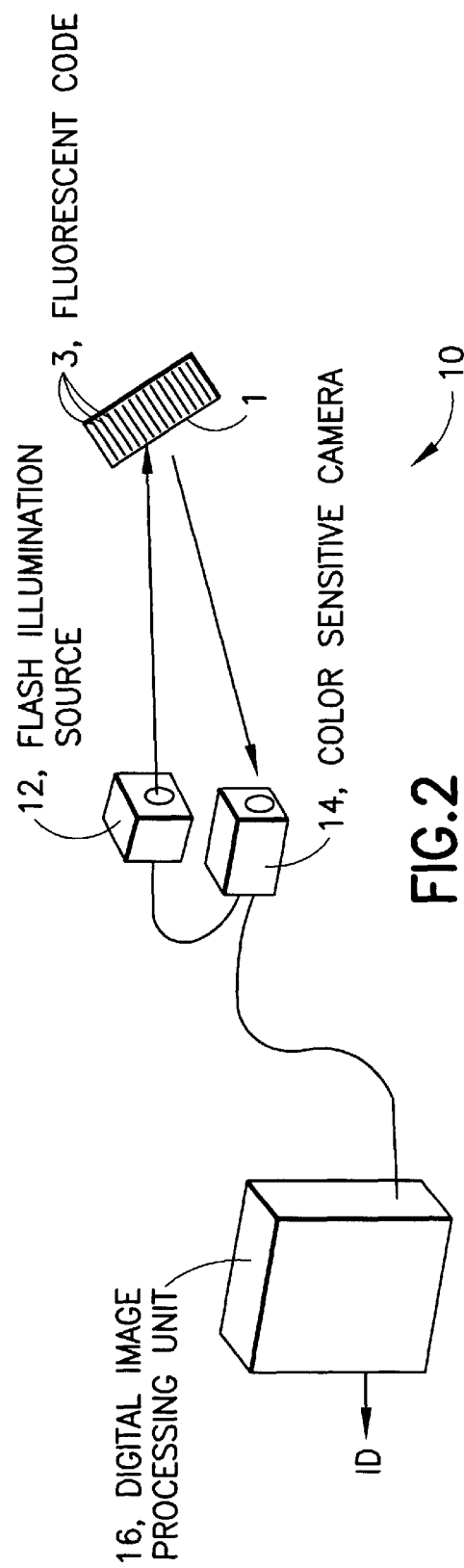
FIG. 2 is a block diagram of a multi-spectral imager system in accordance with this invention.

A preferred embodiment of a multi-spectral imager, also referred to as a reader system 10, is shown in FIG. 2. The reader system 10 includes three major components, which are an illumination unit or source 12 to excite the fluorescence found in the bars 3 on the label 1, a synchronized color sensitive imaging system 14 to obtain image data that includes the label 1, and a digital image processing unit 16 for processing the image data.

To read the label 1 the reader system 10 operates as follows. First, the illumination source 12 is activated. The illumination source 12 may comprise, by example, a Xenon flash-lamp with a short-pass filter, or a light-emitting diode, or a laser, or an incandescent bulb, or even appropriately filtered sunlight. The output light excites the fluorescent bars 3 in the label 1, and the fluorescent emissions are detected by the color sensitive camera unit 14.

An example of a suitable color imaging system for the camera 14 is shown in FIG. 3. A plurality of beam splitters, such as a 30% beam splitter (30-BS) and a 50% beam splitter (50-BS) divide the fluorescence arriving from the label 1 into a plurality of color channels, each of which contains a color-selective imager. In the illustrated embodiment individual ones of three cameras 14A, 14B and 14C have a different filter 15A, 15B and 15C, respectively, over the detector element (DE) such that the illumination wavelength is blocked and the fluorescent color bands are let through, by varying amounts depending on the fluorescence color, onto the detector element. The light impinging on the detector element (DE) can be focussed by an imaging lens (IL).

In this example the camera unit 14 includes the three separate CCD arrays 14A–14C, each with a different long-pass filter 15A–15C. Long-pass filters are preferred because they are significantly less expensive than band-pass filters, and have other advantages which are detailed below in the decoding algorithm. However, band-pass and other types of filters can be used as well.

In general, the reader 14 may comprise a color sensitive CCD camera, a color sensitive CMOS camera, or a combination of two or more grayscale cameras with appropriate filters. The preferred data format from a color sensitive camera is YUV, since this format allows fast separation of the luma component and, therefore, fast spatial location of the imaged fluorescent marks or bars 3.

Figure 4:
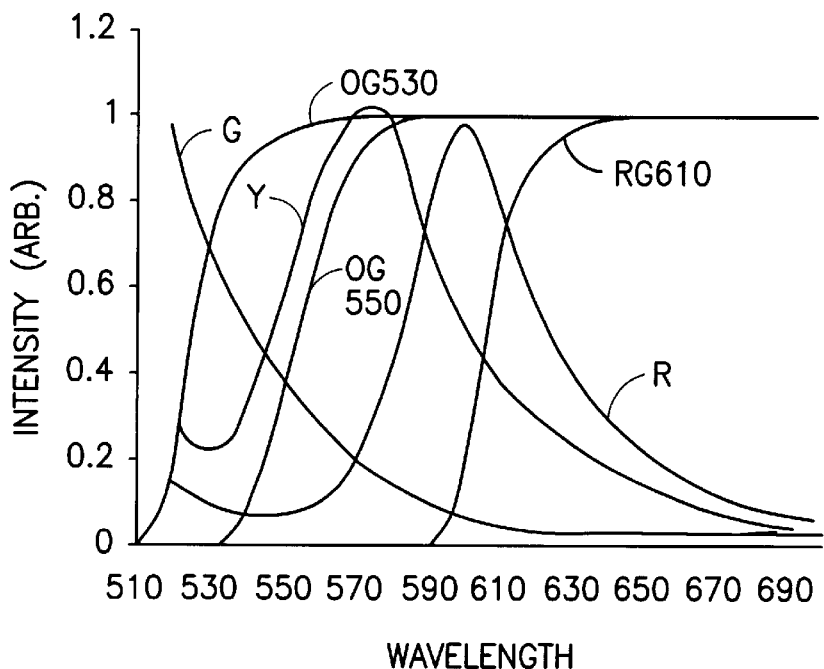
FIG. 4 is a graph illustrating exemplary optical filter responses and fluorescence data.
Figure 5:
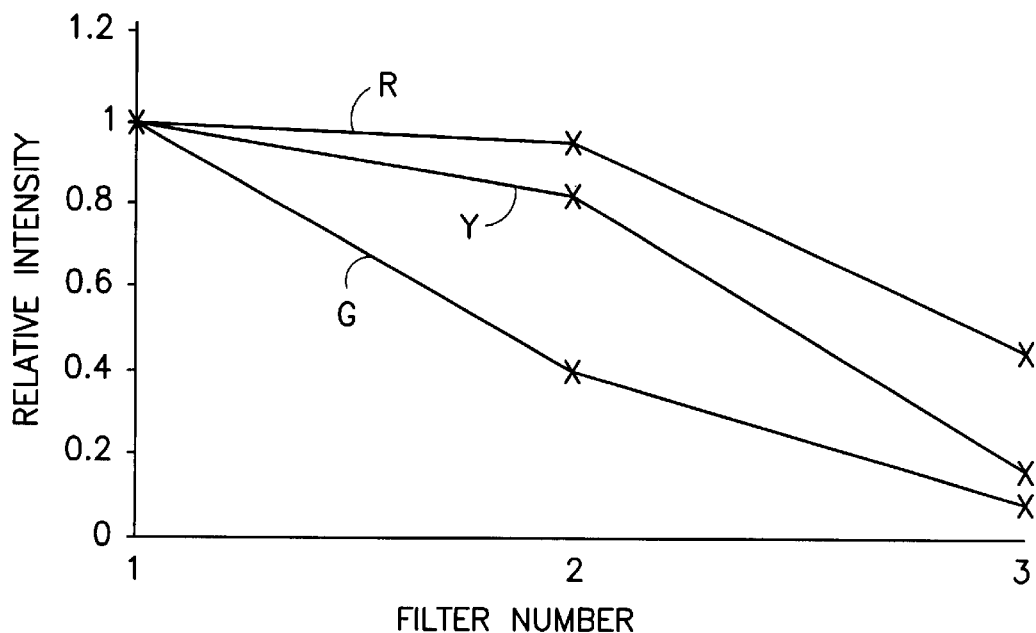
FIG. 5 is a graph illustrating exemplary spectral data for each image pixel that detects with a green, yellow or red bar on the label shown in FIG. 1.

Assume, for example, the long-pass filter responses shown in FIG. 4 (OG530, OG550 and RG610 are specific long-pass filter types, wherein the number designates the wavelength where 50% transmission occurs), and also assume the exemplary fluorescence signals for R, G and Y. Then, the spectral data shown in FIG. 5 (having three points for each pixel) can be decoded by, for example, a radial-basis-function neural network, or some other type of suitable decoder, as will be discussed in further detail below.

The teachings of this invention provide a number of advantages and novel features. First, only the spatial order of the bars 3 is relevant for decoding the label 1. Since the actual spatial position is not important, distortions of the label 1 due to wrinkling of the fabric, etc., does not change the decoded output.

Second, since the cameras 14A–14C can be looking in color bands that naturally show a low background fluorescence (unlike the case where ultraviolet illumination is used) only the code itself appears in the field of view of the camera. This allows for a much faster location of the bar image within an acquired image.

Third, even those codes represented by very faded bars 3 can still be successfully read by increasing the illumination power of source 12 and/or the gain (sensitivity) of the cameras 14A–14C.

Figure 6:
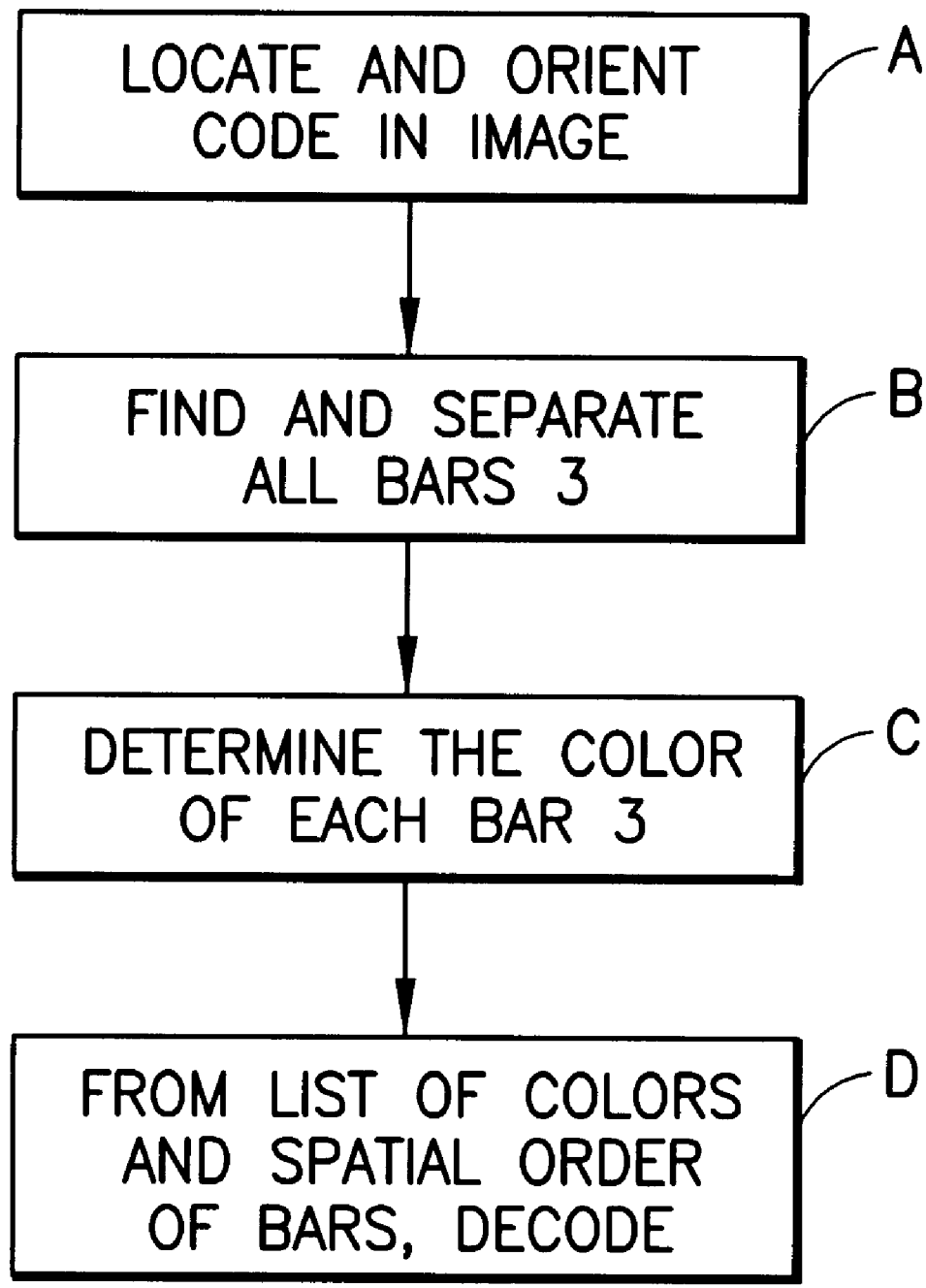
FIG. 6 is a logic flow diagram of an image processing method in accordance with this invention.

In order to successfully read a code from a label 1 the image processing software that executes in the digital image processing unit 16 (FIG. 2) performs the following tasks, in a preferred embodiment, in near-real-time. Reference is also made to the logic flow diagram of FIG. 6

At Block A the image processing software locates and orients the code (encoded region) in the image. At Block B the algorithm locates and separates all of the bar images, that is, the algorithm identifies and separate one from another individual ones of the sub-regions within the encoded region. At Block C the method determines the emission wavelength or color of each bar 3, and at Block D, from the list of colors and the spatial order of the bars 3, the algorithm decodes the information that was previously encoded into the encoded region of the label 1. The execution of Block D is straightforward, once Blocks A–C have been successfully executed.

The first step (Block A) is preferably performed using a center-of-mass and eccentricity algorithm. Since the code appears in the image as a long rectangle, the label 1 can be located and oriented by first finding the center of mass of pixels above a certain threshold, and then by finding the orientation of the major axis around that center of mass. This allows multiple line scans to be taken of the pixel data across the bars in the direction of the major axis. A more sophisticated algorithm outlines and separates all bright areas appearing in the image, so that the need for the label to show all bars across a single line scan is eliminated. In this case dots or any other shape could be used for each fluorescent mark, thereby eliminating the use of the bars 3.

It should be noted that there is one important detail of the optical system that greatly simplifies the steps shown in Blocks A and B. That is, since the preferred type of filters 15A–15C are long-pass filters, the data in the shortest pass filter all look equally bright, i.e. the image appears to be an equalized gray-scale image, no matter what the fluorescence color of the each bar 3 happens to be. This would not be the case if band-pass filters were used. It is much simpler to locate and orient the code in this type of image, since one need not be concerned (at this stage) with the color information.

The use of long-pass filters, rather than band-pass filters, has a further advantage in the assembly of a multi-camera unit. If band-pass filters were used, the gray-scale image needed for code location and orientation would need to be synthesized from all three images, without a prior knowledge of where the code actually is in the field of view. If the synthetic color image is not perfectly registered in the space between arrays, the bars may not overlap one another and, therefore, can give false color information in the decoding step. If all bars can be precisely located in space, however, from one of the long pass images regardless of color, the need for perfect registration between arrays is relaxed. The precise location of a bar is recorded in the first image and then the brightest part of that bar can be found in successively filtered images using a very simple search procedure limited to a few pixels. This means that the misregistration of the arrays can be corrected in software, and furthermore removes the need for micron-scale adjustment of the position and focusing of the arrays during the assembly step.

Once the line data containing the peak positions of the data (corresponding to each bar 3) is located, the spatial position of each peak is discovered (Block B). The peak finding algorithm is preferably based on a pattern recognition algorithm which looks for a characteristic four-point signature at the inflection points of the smoothed data. The peaks are decoded and then sorted according to which peaks appear most like a typical bar (which can be previously determined off-line). The first n highest-scoring peaks are then retained, where n is the number of bars one expects to see (e.g., 16). It less than n bars are found in the image, an error condition is indicated.

Finally, once the bars are located the color information of each bar is obtained (Block C). The color information contains, for an exemplary three color palette, three points per pixel. These three points are then run through a radial basis function neural network (which can be software running on the processing unit 16) to determine the color. The data in the pre-trained neural network is grouped, for example, according to number of wash cycles. This takes into account any overall data shift in the labels due to fading, etc.

Important features of the optically coded labels 1 include, for example: they can be thermally applied using heat seal backing (or simply stitched on as well), they exhibit a wash durability that may outlast the garment to which they are affixed, a high read accuracy (99%) is obtained, they also exhibit high readability under soiled conditions, and finally, reliable reads have been achieved at conveyor speeds of up to 10,000 items/hour.

Advantages of the optically coded labels include, for example, that they do not rely on a contrast-based technology, and soiling of the label has a greatly reduced effect on readability. Furthermore, since the coding is done spatially and by wavelength, the bar spacings and thicknesses on the label 1 have no impact on readability (unlike conventional bar codes), and the labels can be read in any orientation. Furthermore, since the labels can be read using a non-scanning technology, an exemplary 12 inch field of view of the color sensitive camera 14 allows greater latitude when the items are on hangers, which can exhibit swaying motions as then are conveyed past a camera unit 14 mounted next to the conveyor.

A code capacity of an exemplary multi-spectral imaging system operating in accordance with the present invention can be defined by the following:

Number of codes $N_C = T^N$, where

T=number of unique spectral signals (e.g., red, green, yellow), and

N=number of spatial positions.

As an example, for T=5 and N=10 (5 unique spectral signals in 10 positions), the total number of codes $N_C = 10^8$.

Figure 7:
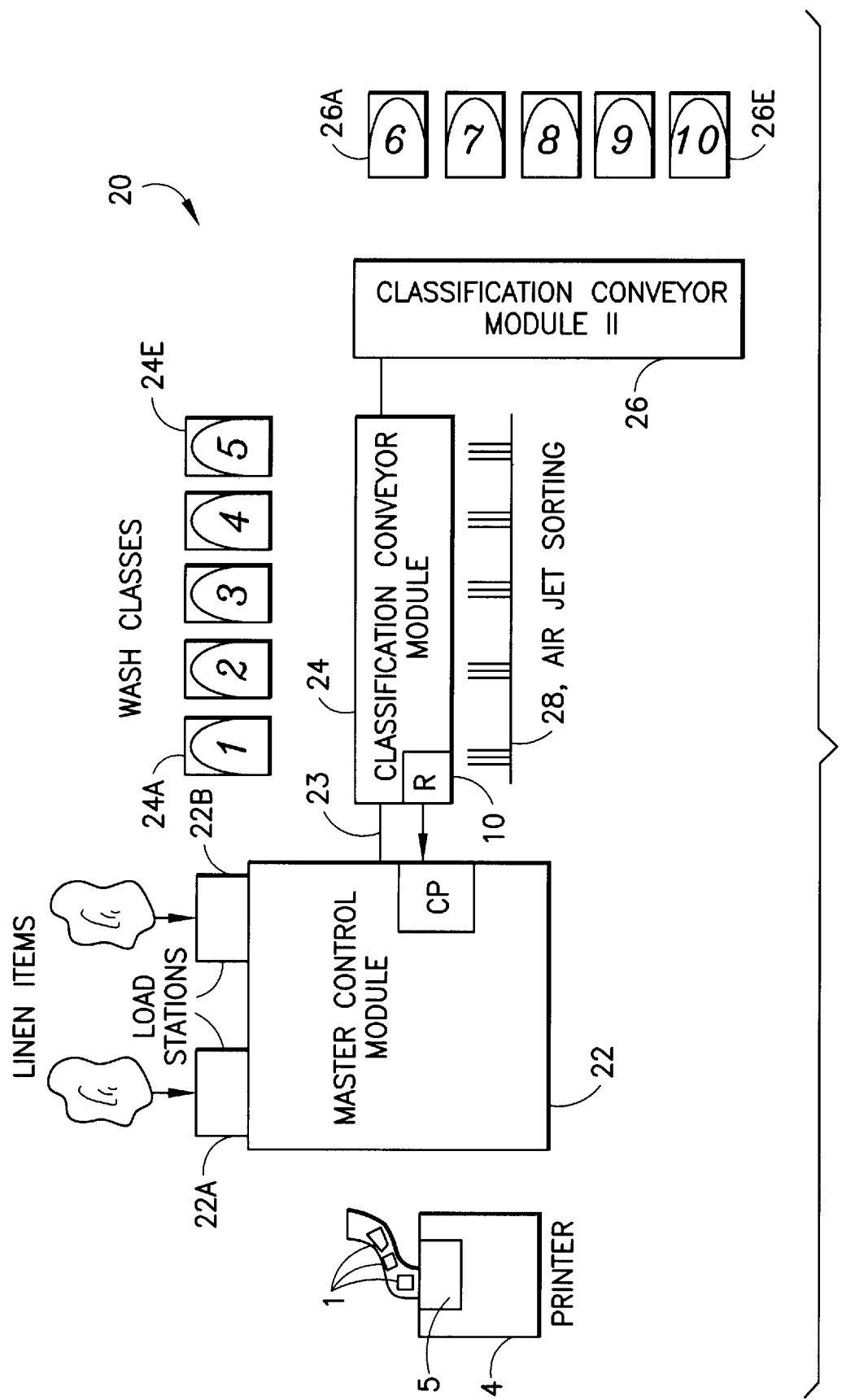
FIG. 7 is a block diagram of an exemplary commercial textile/garment sorting, washing and storage system that is constructed and operated in accordance with embodiments of this invention.

Referring to FIG. 7, an identification and sorting system 20 in accordance with the present invention includes a master control unit or module 22 which is connected to one or more material transport unit modules, shown as a first classification conveyor module 24 and a second classification conveyor module 26. Generally, the soiled unsorted linen and garment items are loaded by various means such as laundry chutes or conveyors (load stations 22A and 22B) into the master control module 22. The soiled and unsorted items are then transported by the one or more conveyor modules 24 and 26 first to wash stations 24A, 24B, etc., via air jet sorting units 28, and then to storage depository locations 26A, 26B, etc. The wash stations 24A–24E may be segregated to wash appropriate wash classes of the linen and garment items. The storage depository locations 26A–26E are segregated so that only a specific type of linen or garment item is stored at each location. The system 20 includes one or more of the above described multi-spectral imagers or reader systems 10, as shown in FIG. 2, which are capable of high speed reading of labels 1 or similar tags or materials in the linen and garment items. The labels 1 and/or tags are encoded for identification purposes with the photonically active materials discussed above. The reader(s) 10 may be located in the classification conveyor modules 24 and 26, or at an interface 23 between the master control module 22 and the classification conveyor modules 24 and 26. The reader(s) 10 are connected to a central processor (CP) in the master control module 22. The central processor uses data from the reader(s) 10 to control the classification conveyor modules 24 and 26 to automatically sort the linen and garment items for washing in the corresponding wash stations 24A–24E, and then for storage in the appropriate storage location 26A–26E. The system 20 can also optionally be operated with non-photonically coded inventory, such as by indicating with a switch closure to the master control module 22 that the conveyor (s) 24, 26 are to be programmed for conventional manual classification. A hybrid system operation can also be employed, wherein, by example, the item classification is done manually, but inventory count and wash sorting is done using the information encoded in the labels 1.

The linen and garment items used with the system 20 of the present invention include the labels 1, threads or yarn with photonically active materials. The photonically active materials are encoded in the labels 1, threads or yarn to identify the linen and garment items by, for example, wash type and storage category. The encoded wash types and categories are recognized by the central processing unit when read by a reader 10 in the system 20.

The linen and garment items used with the system 20 of the present invention preferably employ the labels 1 which leverage the signal-to-noise advantages of light emission with the high code densities of bar coding. Each label 1 contains, as described above, a series of lines or bars 3 that emit one of several wavelengths to represent a unique number. Since the label 1 emits wavelengths of light, rather than reflecting incoming light, as with bar codes, they are highly tolerant of soiling and wash fading.

The photonically active labels 1 of this invention do not depend on the spacing and thickness of the printed lines or bars as is the case in bar code technology. The encoded information of the label 1 is contained in the wavelength domain, and in the spatial sequence of wavelengths. As a result, the labels 1 provide significantly more robust and simple code patterns than found in conventional bar coding techniques. This attribute allows the labels 1 to be read accurately in any orientation with severe bending, distortion, or other problems often encountered with garments in high production laundries. The photonically active labels 1 may also be read over a wider field of view (e.g., 20 cm by 15 cm) than bar codes, since the requirement to resolve narrow line features does not exist.

Figure 8:
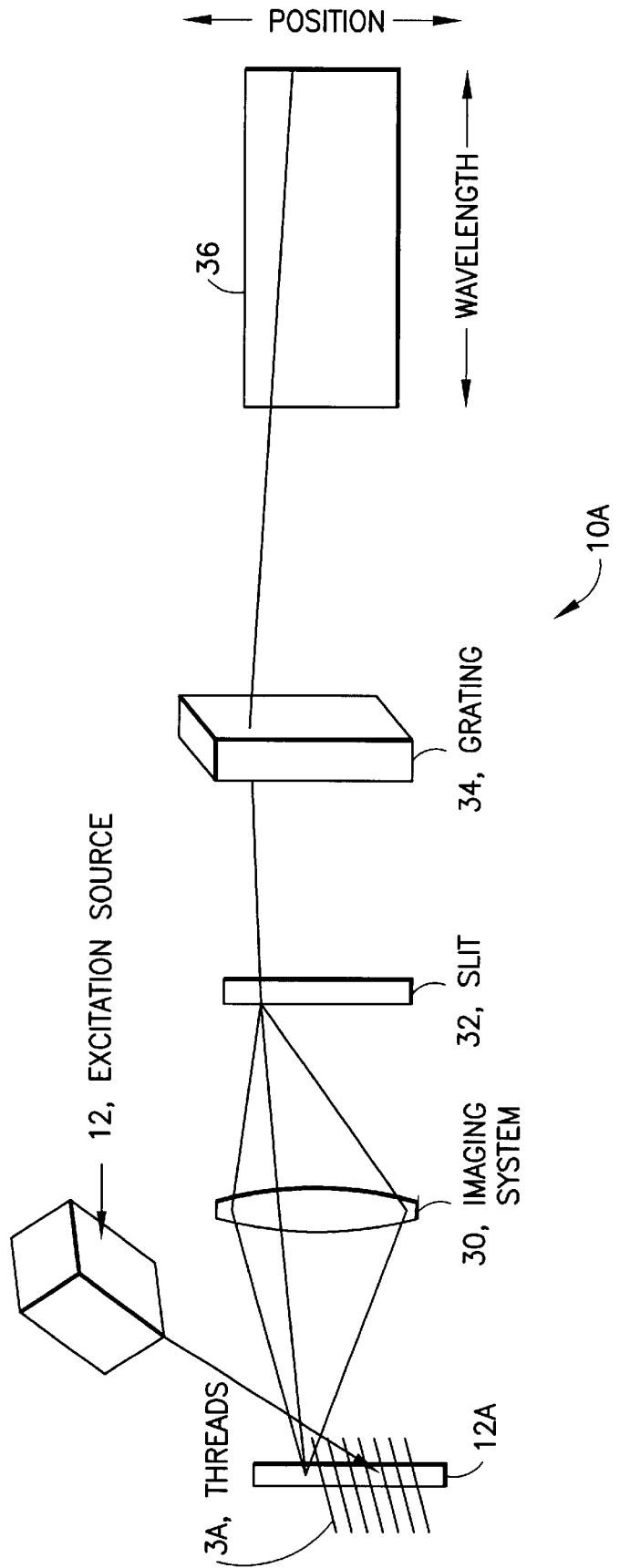
FIG. 8 depicts an alternative embodiment of a multispectral imaging system for reading the label in FIG. 1.

FIG. 8 illustrates a further embodiment of a multi-spectral reader system 10A, wherein fluorescent yarn or fluorescent threads 3A or the bars 3 are illuminated within an area 12A by the excitation source 12, and the resulting fluorescent emissions are collected by an imaging system 30, passed through a slit 32 to a grating 34 or some other suitable wavelength resolving device, to produce a spectrum 36. The spectrum 36 contains the encoded information from the threads 3A or bars 3, and the information is expressed as a function of both wavelength and position. The spectrum 36 could be converted to pixels by a two dimensional CCD detector or other suitable means, and the locations of the those pixels above a threshold value converted to the encoded information by using a suitably trained neural network or some other image processing technique.

Thus, while the invention has been particularly shown and described with respect to preferred embodiments thereof, it will be understood by those skilled in the art that changes in form and details may be made therein without departing from the scope and spirit of the invention.

What is claimed is:

1. A method for encoding information onto an article, comprising:
   expressing the information as a multi-digit number;
   encoding the number as a plurality of regions that are disposed in a predetermined spatial sequence, wherein each region emits one of a plurality of predetermined wavelengths comprising a set of wavelengths; and
   the plurality of regions comprising additional regions for indicating a first end of the spatial sequence with a first region that emits a first predetermined wavelength, and for indicating a second end of the spatial sequence with a second region that emits a second predetermined wavelength.

2. A method as in claim 1, and further comprising applying the plurality of regions to the article.

3. A method as in claim 1, and further comprising applying the plurality of regions to the article by printing the plurality of regions using a plurality of different fluorescent inks.

4. A method as in claim 1, and further comprising applying the plurality of regions to the article by printing the plurality of regions onto a label using a plurality of different fluorescent inks, and then affixing the label to the article.

5. A method as in claim 1, and further comprising applying the plurality of regions to the article by impact printing the plurality of regions onto a label using a plurality of different fluorescent inks, and then affixing the label to the article by a thermal process.

6. A method as in claim 1, and further comprising:
   illuminating the plurality of regions with excitation light;
   detecting a plurality of resulting wavelength emissions from the plurality of regions; and
   decoding the number from the plurality of resulting wavelength emissions and their location in the linear sequence.

7. A method as in claim 6, and further comprising identifying the article from the decoded number.

8. A method as in claim 6, and further comprising controlling a path that the article takes from the decoded number.

9. A method for encoding information onto an article comprised of a linen, textile or garment, comprising:
   expressing the information as a multi-digit number;
   encoding the number as a plurality of regions that are disposed in a predetermined linear sequence, wherein each region emits one of a plurality of predetermined wavelengths comprising a set of wavelengths;
   the plurality of regions comprising additional regions for indicating a first end of the spatial sequence with a first region that emits a first predetermined wavelength, and for indicating a second end of the spatial sequence with a second region that emits a second predetermined wavelength; and
   applying the plurality of regions to the article by printing the plurality of regions onto a label using a plurality of different fluorescent inks, and then affixing the label to the article.

10. A method as in claim 9, wherein applying the plurality of regions to the label impact prints the plurality of regions onto the label, and then affixes the label to the article by a thermal process.

11. A method as in claim 9, and further comprising:
    conveying the linen, textile or garment past a reader station; and
    at the reader station, illuminating the plurality of regions with excitation light, detecting a plurality of resulting wavelength emissions from the plurality of regions and decoding the number from the plurality of resulting wavelength emissions and their location in the linear sequence.

12. A method as in claim 11, and further comprising identifying the type of linen, textile or garment from the decoded number.

13. A method as in claim 11, and further comprising controlling a path that the linen, textile or garment takes based on the decoded number.

14. A method as in claim 11, and further comprising selecting a type of cleaning process for the linen, textile or garment based on the decoded number.

15. A method as in claim 11, and further comprising selecting a storage location for the linen, textile or garment based on the decoded number.

16. A method for encoding information onto an article, comprising:
    encoding information as a base n numeric representation;

defining a set of n wavelengths; and applying a plurality of regions to a substrate in a predetermined linear sequence, wherein each region comprises an emitter of one of said n wavelengths such that said linear sequence of regions represents said base n numeric representation, the plurality of regions comprising additional regions for indicating a first end of the predetermined linear sequence with a first region that emits a first predetermined wavelength, and for indicating a second end of the predetermined linear sequence with a second region that emits a second predetermined wavelength.

17. A method as in claims 16, and further comprising applying the plurality of regions to the article.

18. A method as in claim 16, wherein the article comprises the substrate.

19. A method as in claim 16, and further comprising applying the plurality of regions to the article by printing the plurality of regions using a plurality of different fluorescent inks.

20. A method as in claim 16, and further comprising applying the plurality of regions to the article by printing the plurality of regions onto a label using a plurality of different fluorescent inks, and then affixing the label to the article.

21. A method for encoding information, comprising:

encoding information such that the encoded information can be represented using a set of n wavelengths, where n is greater than 2; and forming a plurality of marks having a predetermined order, where each mark comprises an emitter of one of said n wavelength, where the order is predetermined to represent the encoded information, and where the predetermined order is such that a first spatial reference point is represented using a first mark that emits a first predetermined wavelength, and such that a second spatial reference point is represented using a second mark that emits a second predetermined wavelength, whereby the encoded information can be read by identifying the presence of individual ones of wavelengths of the set of n wavelengths in a direction from the first spatial reference point to the second spatial reference point, or in a direction from the second spatial reference point to the first spatial reference point.

22. A method as in claim 21, and further comprising forming at least one additional mark for representing error correction information.

23. A method as in claim 21, wherein the plurality of marks are formed on a linen or textile.

24. A method as in claim 21, wherein the plurality of marks are formed on a piece of mail.

25. A method as in claim 21, wherein the plurality of marks are formed on a package.

26. A method as in claim 21, wherein the plurality of marks are formed on a document.

27. A method as in claim 21, wherein the plurality of marks are formed on a financial instrument.

28. A method for encoding information, comprising:

encoding information such that the encoded information can be represented using a set of n wavelengths, where n is greater than 2; and forming a plurality of marks having a predetermined order, where each mark comprises an emitter of one of said n wavelength, where the order is predetermined to represent the encoded information, and where the predetermined order is such that a first spatial reference point is represented using a first mark that emits a first predetermined wavelength that is selected from said set of n wavelengths, and such that a second spatial reference point is represented using a second mark that emits a second predetermined wavelength that is selected from said set of n wavelengths.

29. A method as in claim 28, wherein the encoded information is read by identifying the presence of individual ones of wavelengths of the set of n wavelengths in a direction from the first spatial reference point to the second spatial reference point, or in a direction from the second spatial reference point to the first spatial reference point.

30. A method as in claim 28, and further comprising forming at least one additional mark for representing error correction information.

31. A method as in claim 28, and further comprising forming a two-dimensional image that contains the plurality of marks; locating an image of the plurality of marks in the image; processing the image of the plurality of marks to identify the presence of individual ones of wavelengths of the set of n wavelengths; and decoding the encoded information in accordance with the wavelengths that are identified as being present.

32. A method as in claim 28, wherein the plurality of marks are formed on a linen or textile.

33. A method as in claim 28, wherein the plurality of marks are formed on a piece of mail.

34. A method as in claim 28, wherein the plurality of marks are formed on a package.

35. A method as in claim 28, wherein the plurality of marks are formed on a document.

36. A method as in claim 28, wherein the plurality of marks are formed on a financial instrument.

37. A method as in claim 28, wherein the plurality of marks are formed on a substrate that is susceptible during use to soiling and loss of contrast between the marks and the substrate.

* * * * *